Patented Feb. 27, 1940

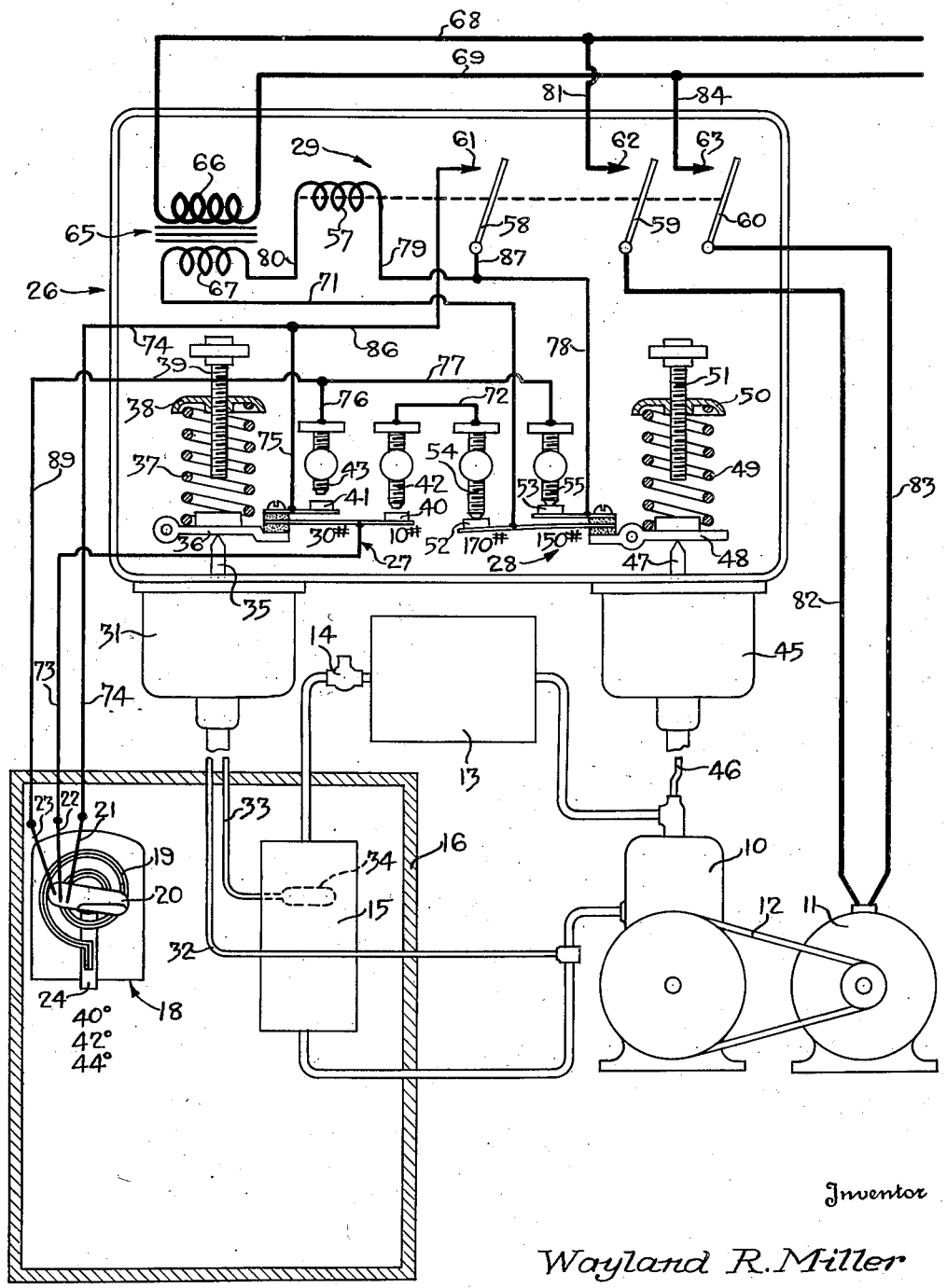

2,191,967

UNITED STATES PATENT OFFICE 2,191,967

CONTROL SYSTEM FOR REFRIGERATING APPARATUS

Wayland R. Miller, Nashotah, Wis., assignor to Minneapolis-Honeywell Regulator Company, Minneapolis, Minn., a corporation of Delaware Application September 16, 1936, Serial No. 101,107

29 Claims. (Cl. 62—4)

This invention relates to a control system for a refrigerating apparatus.

It is the prime object of this invention to provide a control system for a refrigerating apparatus responsive to a condition directly produced by the refrigerating apparatus, such as evaporator temperature or suction pressure, and responsive to a condition indirectly produced by the refrigerating apparatus, such as temperature to be controlled, wherein the refrigerating apparatus is placed in operation only when the suction pressure and the temperature rise to predetermined values and wherein the refrigerating apparatus is continued in operation under the control of the temperature responsive means even though the suction pressure decreases due to operation of the refrigerating apparatus. By reason of this control system defrosting of the refrigerating apparatus during each cycle of operation may be assured since it is impossible to start the refrigerating apparatus until the suction pressure rises to a predetermined value, which may be a defrosting value.

A further object of this invention is to provide a control system of the type described above, with provision for stopping operation of the refrigerating apparatus when the suction pressure decreases to a predetermined low value or when the pressure on the high pressure side of the refrigerating apparatus rises above a predetermined value.

Under certain circumstances it may happen that the condition directly produced by the refrigerating apparatus, such as suction pressure, may not be permitted to increase to a defrosting or a starting value. Such a circumstance might occur when the refrigerating apparatus is located in a place the temperature of which may decrease to such a value as to prevent increasing of the suction pressure to a value which would cause defrosting or starting of the refrigerating apparatus. Therefore, auxiliary means must be provided for starting the refrigerating apparatus independently of the condition directly produced by the refrigerating apparatus, such as suction pressure.

It is therefore another object of this invention to provide in combination with the type of control system outlined above, means for permitting starting of the refrigerating apparatus even though the condition directly produced by the refrigerating apparatus is prevented from increasing to the desired starting value.

More specifically, a further object of this invention is to make the auxiliary starting apparatus responsive to a predetermined higher value of the condition indirectly produced by the refrigerating apparatus such as an increase in the box temperature to a predetermined high value.

Other objects and advantages will become apparent to those skilled in the art upon reference to the accompanying specification, claims and drawing.

For a more thorough understanding of this invention reference is made to the accompanying drawing, in which is diagrammatically disclosed my control system as applied to a mechanical refrigerating apparatus.

The refrigerating apparatus is shown to comprise a compressor 10 operated by an electric motor 11 through a belt 12, a condenser 13, an expansion valve 14 and an evaporator 15, all connected together in a manner well known in the art. The evaporator 15 may perform any usual function such as a cooling function or a dehumidifying function, but for purposes of illustration I have shown the evaporator 15 located in a box 16 for cooling the interior thereof.

Located in the box 16 is a condition responsive device responsive to changes in a condition indirectly produced by the refrigerating apparatus. Since I have shown the condition indirectly produced by the refrigerating apparatus to be a temperature condition, I provide a condition responsive means in the form of a thermostat generally designated at 18. The thermostat 18 may comprise a bimetallic element 19 responding to changes in temperature in the box 16 for operating a mercury switch 20 having electrodes 21, 22 and 23, the electrode 23 being shorter than the others for purposes to be more fully pointed out hereafter. The bimetallic element 19 and consequently the setting of the thermostat 18 may be adjusted by means of a lever 24. For purposes of illustration it is assumed that the switch 20 is moved to an open position when the box temperature decreases to 40°, that the electrodes 21 and 22 are bridged when the temperature in the box increases to 42° and that the electrodes 21, 22 and 23 are bridged when the temperature increases to 44°.

A control mechanism is generally shown at 26 and may comprise a switching mechanism generally designated at 27 responsive to the condition directly produced by the refrigerating apparatus, such as suction pressure or evaporator temperature, a switching mechanism generally designated at 28 responsive to the condition of the refrigerating apparatus, such as the pressure on the high pressure side of the refrigerating apparatus, and a relay generally designated at 29, the relay 29 being controlled by the box thermostat 18 and the switching mechanisms 27 and 28 to control the operation of the refrigerating apparatus.

A bellows casing 31 containing a bellows is connected by a pipe 32 to the low pressure side of the refrigerating apparatus or by a capillary tube 33 to a bulb 34 located in close proximity to the evaporator 15. The bellows within the bellows casing 31 operates a plunger 35 which abuts a pivoted lever 36. The pivoted lever 36 is urged in a clockwise direction by a spring 37 engaging an adjusting collar 38 screw-threadedly mounted on a stationary screw 39. Contacts 40 and 41 suitably insulated from each other and from the lever 36 are carried by the lever 36 and are adapted to sequentially engage stationary contacts 42 and 43. Although the switching mechanism may be operated either by evaporator temperature or by suction pressure, for purposes of illustration it will be assumed that this switching mechanism is operated by suction pressure. Since suction pressure is an indication of evaporator temperature, both control means will produce substantially the same results. Upon an increase in suction pressure the spring 37 is compressed to move the contacts 40 and 41 into engagement with the contacts 42 and 43. Upon a decrease in suction pressure the spring 37 breaks engagement between these contacts. By suitably adjusting the spring 37 by rotation of the collar 38 the pressure setting of this portion of the control mechanism may be adjusted at will. By suitably adjusting the adjustable stationary contacts 42 and 43 the pressure values at which these contacts are engaged by the movable contacts 40 and 41 and consequently the differential may be adjusted at will. For purposes of illustration it is assumed that the contact 40 moves into engagement with the contact 42 at a suction pressure of 10 lbs. and that the contact 41 moves into engagement with the contact 43 at a suction pressure of 30 lbs.

The control mechanism also includes a bellows casing 45 which is connected by a pipe 46 to the high pressure side of the refrigerating apparatus. The bellows within the bellows casing 45 operates a plunger 47 which abuts a pivoted lever 48. The pivoted lever 48 is urged in a clockwise direction by a spring 49 abutting a collar 50 mounted upon a stationary screw 51. Contacts 52 and 53 suitably insulated from each other and from the lever 48 are carried by the lever 48 and are adapted to sequentially disengage stationary adjustable contacts 54 and 55. The spring 49 normally holds these contacts in engagement but when the high pressure increases, contact 53 first disengages contact 55 and then contact 52 disengages contact 54. By suitably adjusting the spring 49 by the collar 50 the pressure setting of this portion of the control mechanism may be adjusted at will and by suitably adjusting the contacts 54 and 55 the points at which the contact 52 and 53 are disengaged from the contacts 54 and 55 may be adjusted at will. For purposes of illustration it is assumed that the contact 53 disengages the contact 55 at 150 lbs. high pressure and that the contact 52 disengages the contact 54 at 170 lbs. high pressure.

The relay 29, which may be located within the control mechanism 26, comprises a relay coil 57 for operating switches 58, 59 and 60 with respective contacts 61, 62 and 63, the arrangement being such that when the relay coil 57 is energized switch arms 58, 59 and 60 are moved into engagement with contacts 61, 62 and 63, and when the relay coil 57 is deenergized these switch arms are moved out of engagement with their respective contacts by means of gravity, springs or other means, not shown. A stepdown transformer generally designated at 65 comprises a primary 66 and a secondary 67 for supplying electrical energy to the control system, the primary 66 being connected across line wires 68 and 69 leading from some source of power, not shown.

With the parts in the position shown in the drawing the pressure on the high pressure side of the refrigerating apparatus is below 150 lbs., the suction pressure is below 10 lbs. and the box temperature is less than 40°. Therefore, the relay coil 57 is deenergized and the relay is opened whereby the refrigerating apparatus is shut down. Since the refrigerating apparatus is shut down the suction pressure will increase and the box temperature will increase. When the suction pressure increases to 30 lbs. so as to cause engagement of contacts 40—42 and 41—43 and when the box temperature has risen to 42° so as to cause bridging of the electrodes 21 and 22 a starting circuit is completed from the secondary 67 through wire 71, contacts 52 and 54, wire 72, contacts 42 and 40, wire 73, electrodes 22 and 21, wires 74 and 75, contacts 41 and 43, wires 76 and 77, contacts 55 and 53, wires 78 and 79, relay coil 57 and wire 80 back to the secondary 67. Completion of this starting circuit causes energization of the relay coil 57 to move the switch arms 58, 59 and 60 into engagement with the contacts 61, 62 and 63.

Movement of the switch arms 59 and 60 into engagement with the contacts 62 and 63 completes a circuit from the line wire 68 through wire 81, contact 62, switch arm 59, wire 82, compressor motor 11, wire 83, switch arm 60, contact 63 and wire 84 back to the other line wire 69. This causes operation of the refrigerating apparatus. From the above it is seen that the refrigerating apparatus is placed in operation only when the suction pressure increases to 30 lbs. to close both of the sequentially operated switches and when the box temperature has risen to 42° to bridge the electrodes 21 and 22, these contacts and these electrodes being arranged in series. It is also seen that both of the sequentially operated contacts of the high pressure cutout switching mechanism 28 are located in series in this starting circuit and therefore if the pressure on the high pressure side of the refrigerating apparatus were greater than 150 lbs. starting of the refrigerating apparatus would be prevented.

Movement of the switch arm 58 into engagement with the contact 61 upon energization of the relay coil 57 completes a maintaining circuit from the secondary 67 through wire 71, contacts 52 and 54, wire 72, contacts 42 and 40, wire 73, electrodes 22 and 21, wires 74 and 86, contact 61, switch arm 58, wires 87 and 79, relay coil 57 and wire 80 back to the secondary 67. Completion of this maintaining circuit maintains the refrigerating apparatus in operation independently of the contacts 41 and 43 of the suction pressure switching mechanism 27 and contacts 53 and 55 of the high pressure cut-out switching mechanism 28. In other words, the contacts 41—43 and 53—55 are shunted out leaving only the contacts 40—42 and 52—54 and the electrodes 22—21 in series. Therefore, the refrigerating apparatus is maintained in operation under the control of the box thermostat 18 independently of the suction pressure switching mechanism 27. Therefore, the refrigerating apparatus is maintained in operation until such time as the box temperature shall decrease to 40°. However, if the suction pressure should decrease to 10 lbs., as illustrated, so as to disengage contacts 40 and 42 the refrigerating apparatus will be shut down at this suction pressure value. Also, if the pressure on the high pressure side of the refrigerating apparatus should increase to 170 lbs. the refrigerating apparatus would be shut down. After the refrigerating apparatus has been shut down in any of these manners it is necessary to close both of the sequentially operated switches of the suction pressure switching mechanism 27 and the high pressure cut-out mechanism 28 and to bridge electrodes 21 and 22 of the temperature responsive switching mechanism 18 in order to restart the refrigerating apparatus.

Stated briefly, the refrigerating apparatus may be placed in operation only when the box temperature, the condition indirectly produced by the refrigerating apparatus, and the suction pressure, the condition directly produced by the refrigerating apparatus, increase to predetermined values and that the refrigerating apparatus is maintained in operation after being so started under the control of the box thermostat independently of the suction pressure until such time as the box temperature shall be decreased to the desired value. Provision is made, however, for shutting down the refrigerating apparatus in case the suction pressure should decrease to a predetermined low value, 10 lbs. as illustrated. Provision is also made for shutting down the refrigerating apparatus in case the pressure on the high pressure side of the refrigerating apparatus should increase above a predetermined value. More specifically, provision is made for preventing starting of the refrigerating apparatus if the pressure on the high pressure side is greater than one predetermined value and for preventing continued operation of the refrigerating apparatus in case the pressue on the high pressure side is greater than a predetermined high value.

If it be desired, therefore, to cause defrosting of the refrigerating apparatus during each cycle of operation the adjustable contact 43 may be adjusted so that the suction pressure will have to rise to a value which would cause defrosting in order to start the refrigerating apparatus.

Under certain circumstances, as pointed out above, it may be impossible for the suction pressure to rise to the starting value, 30 lbs. as illustrated, by reason of low temperatures surrounding the compressor 10 or for other reasons. In order to start the refrigerating apparatus under these conditions means must be provided in parallel with the contacts 41 and 43 of the suction pressure switching mechanism 27. This means is shown to be the short electrode 23 of the thermostat 18. Assume that the box temperature increases to 42° but that the suction pressure does not increase to 30 lbs. and normally under these circumstances the refrigerating apparatus is not placed in operation. The box temperature will therefore increase and when it has increased to 44° so as to cause bridging of the electrodes 21, 22 and 23, a circuit is completed from the secondary 67 through wire 71, contacts 52 and 54, wire 72, contacts 42 and 40, wire 73, electrodes 22 and 23, wires 89 and 77, contacts 55 and 53, wires 78 and 79, relay coil 57 and wire 80 back to the secondary 67. Completion of this circuit, therefore, causes starting of the refrigerating apparatus independently of the suction pressure, and when the refrigerating apparatus is so started it is continued in operation by the above referred to maintaining circuit until such time as the box temperature shall decrease to 40°.

From the above it is seen that I have provided a control system for a refrigerating apparatus wherein the refrigerating apparatus can be placed in operation only when the condition directly produced by the refrigerating apparatus (suction pressure) and the condition indirectly produced by the refrigerating apparatus (box temperature) shall increase to predetermined values, wherein the refrigerating apparatus is maintained in operation independently of the condition directly produced by the refrigerating apparatus, until such time as the condition indirectly produced by the refrigerating apparatus shall be decreased to the desired value, wherein the refrigerating apparatus is stopped in case the condition directly produced by the refrigerating apparatus shall decrease to a predetermined minimum, wherein the operation of the refrigerating apparatus is prevented in case the condition of the refrigerating apparatus (pressure on the high pressure side) shall increase above predetermined values, wherein the refrigerating apparatus may be started independently of the condition directly produced by the refrigerating apparatus and wherein this auxiliary starting means is made responsive to conditions indirectly produced by the refrigerating apparatus.

Although I have shown for purposes of illustration one form of my invention, other forms thereof may become apparent to those skilled in the art and consequently my invention is to be limited only by the scope of the appended claims and prior art.

I claim as my invention:

1. A control system for a refrigerating apparatus having an evaporator for controlling the condition of a medium and a mechanism for controlling the circulation of refrigerant through the evaporator, the combination of, control means responsive to the condition of the medium controlled by the evaporator, control means responsive to a condition which is a measure of evaporator temperature, control means responsive to a condition which is a measure of the pressure on the high pressure side of the refrigerating apparatus, means controlled by all of the control means to operate the mechanism to start circulation of refrigerant through the evaporator only when the condition of the medium rises to a predetermined high value, the evaporator temperature rises to a predetermined high value and the pressure on the high pressure side decreases to a predetermined low value and to stop circulation of refrigerant through the evaporator when either the condition of the medium decreases to a predetermined low value, or the temperature of the evaporator decreases to a predetermined low value or the pressure on the high pressure side increases to a predetermined high value, and means for rendering ineffective the control means responsive to the condition which is a measure of evaporator temperature to cause refrigerant to be circulated through the evaporator in accordance with the condition of the medium regardless of the temperature of the evaporator.

2. A control system for a refrigerating apparatus having an evaporator for controlling the condition of a medium and a mechanism for controlling the circulation of refrigerant through the evaporator, the combination of, control means responsive to the condition of the medium controlled by the evaporator, control means responsive to a condition which is a measure of evaporator temperature, means controlled by both control means to operate the mechanism to start circulation of refrigerant through the evaporator only when the condition of the medium rises to a predetermined value and the evaporator temperature rises to a predetermined value, and means for rendering ineffective the control means responsive to the condition which is a measure of evaporator temperature to cause refrigerant to be circulated through the evaporator in accordance with the condition of the medium regardless of the temperature of the evaporator.

3. A control system for a refrigerating apparatus having an evaporator for controlling the condition of a medium and a mechanism for controlling the circulation of refrigerant through the evaporator, the combination of, control means responsive to the condition of the medium controlled by the evaporator, control means responsive to a condition which is a measure of evaporator temperature, means controlled by both control means to operate the mechanism to start circulation of refrigerant through the evaporator only when the condition of the medium rises to a predetermined value and the evaporator temperature rises to a predetermined value, and means responsive to the condition of the medium controlled by the evaporator and operative when the condition of the medium rises above the predetermined value for rendering ineffective the control means responsive to the condition which is a measure of evaporator temperature to cause refrigerant to be circulated through the evaporator in accordance with the condition of the medium regardless of the temperature of the evaporator.

4. A control system for a refrigerating apparatus having an evaporator for controlling the condition of a medium and a mechanism for controlling the circulation of refrigerant through the evaporator, the combination of, control means responsive to the condition of the medium controlled by the evaporator, control means responsive to a condition which is a measure of evaporator temperature, means controlled by both control means to operate the mechanism to start circulation of refrigerant through the evaporator only when the condition of the medium rises to a predetermined high value and the evaporator temperature rises to a predetermined high value and to stop circulation of refrigerant through the evaporator when either the condition of the medium decreases to a predetermined low value or evaporator temperature decreases to a predetermined low value, and means for rendering ineffective the control means responsive to the condition which is a measure of evaporator temperature to cause refrigerant to be circulated through the evaporator in accordance with the condition of the medium regardless of the temperature of the evaporator.

5. A control system for a refrigerating apparatus having an evaporator for controlling the condition of a medium and a mechanism for controlling the circulation of refrigerant through the evaporator, the combination of, control means responsive to the condition of the medium controlled by the evaporator, control means responsive to a condition which is a measure of evaporator temperature, means controlled by both control means to operate the mechanism to start circulation of refrigerant through the evaporator only when the condition of the medium rises to a predetermined high value and the evaporator temperature rises to a predetermined high value and to stop circulation of refrigerant through the evaporator when either the condition of the medium decreases to a predetermined low value or the evaporator temperature decreases to a predetermined low value, and means responsive to the condition of the medium controlled by the evaporator and operative when the condition of the medium rises above the predetermined value for rendering ineffective the control means responsive to the condition which is a measure of evaporator temperature to cause refrigerant to be circulated through the evaporator in accordance with the condition of the medium regardless of the temperature of the evaporator.

6. A control system for a refrigerating apparatus having an evaporator for controlling the condition of a medium and a mechanism for controlling the circulation of refrigerant through the evaporator, the combination of, control means responsive to the condition of the medium controlled by the evaporator, control means responsive to a condition which is a measure of evaporator temperature, control means responsive to a condition which is a measure of the pressure on the high pressure side of the refrigerating apparatus, means controlled by all of the control means to operate the mechanism to start circulation of refrigerant through the evaporator only when the condition of the medium rises to a predetermined high value, the evaporator temperature rises to a predetermined high value and the pressure on the high pressure side decreases to a predetermined low value and to stop circulation of refrigerant through the evaporator when either the condition of the medium decreases to a predetermined low value or the pressure on the high pressure side increases to a predetermined high value, and means for rendering ineffective the control means responsive to the condition which is a measure of evaporator temperature to cause refrigerant to be circulated through the evaporator in accordance with the condition of the medium regardless of the temperature of the evaporator.

7. A control system for a refrigerating apparatus having an evaporator for controlling the condition of a medium and a compressor, the combination of, first switch means movable to starting and stopping positions, second switch means movable to starting and stopping positions, means responsive to the condition of the medium controlled by the evaporator for operating the first switch means to move the first switch means to the starting position when the condition rises to a predetermined high value and to move the first switch means to the stopping position when the condition decreases to a predetermined low value, means responsive to a condition which is a measure of evaporator temperature for operating the second switch means to maintain the second switch means in the starting position only when the evaporator temperature is at a defrosting value and to maintain the second switch means in the stopping position only when the evaporator temperature is at a predetermined low value, third switch means movable to starting and stopping positions, means responsive to a condition which is a measure of the pressure on the high pressure side of the refrigerating apparatus for operating the third switch means to maintain the third switch means in the starting position only when the pressure is at a predetermined low value and to maintain the third switch means in the stopping position only when the pressure is at a predetermined high value, and means controlled by all of the switch means to start operation of the compressor only when all of the switch means move to the starting positions and to stop operation of the compressor when any of the switch means moves to the stopping positions.

8. A control system for a refrigerating apparatus having an evaporator for controlling the condition of a medium and a compressor, the combination of, a relay for causing operation of the compressor when energized and including a maintaining switch which is closed when the relay is energized, first switch means, means responsive to the condition of the medium controlled by the evaporator for closing the first switch means when the condition rises to a predetermined high value and for opening the switch means when the condition decreases to a predetermined low value, second switch means, means responsive to a condition which is a measure of evaporator temperature for closing the second switch means when the evaporator temperature rises to a predetermined high value, means for completing a circuit through the relay and the first and second switch means to energize the relay and start the compressor, and means for completing a circuit through the relay, the first switch means and the maintaining switch to maintain the relay energized and the compressor operating.

9. A control system for a refrigerating apparatus having an evaporator for controlling the condition of a medium and a compressor, the combination of, a relay for causing operation of the compressor when energized and including a maintaining switch which is closed when the relay is energized, first switch means, means responsive to the condition of the medium controlled by the evaporator for closing the first switch means when the condition rises to a predetermined high value and for opening the switch means when the condition decreases to a predetermined low value, second switch means, means responsive to a condition which is a measure of evaporator temperature for closing the second switch means when the evaporator temperature rises to a predetermined high value, means for completing a circuit through the relay and the first and second switch means to energize the relay and start the compressor, means for completing a circuit through the relay, the first switch means and the maintaining switch to maintain the relay energized and the compressor operating, third switch means, means for closing the third switch means when the condition of the medium controlled by the evaporator rises above the predetermined high value, and means for connecting the third switch means in parallel with the second switch means.

10. A control system for a refrigerating apparatus having an evaporator for controlling the condition of a medium and a compressor, the combination of, a relay for causing operation of the compressor when energized and including a maintaining switch which is closed when the relay is energized, first switch means, means responsive to the condition of the medium controlled by the evaporator for closing the first switch means when the condition rises to a predetermined high value and for opening the switch means when the condition decreases to a predetermined low value, second switch means, means responsive to a condition which is a measure of evaporator temperature for closing the second switch means when the evaporator temperature rises to a predetermined high value, third switch means, means responsive to a condition which is a measure of pressure on the high pressure side of the refrigerating apparatus for closing the third switch means when the pressure decreases to a predetermined value, means for completing a circuit through the relay, and the first, second and third switch means to energize the relay and start the compressor, and means for completing a circuit through the relay, the first switch means and the maintaining switch to maintain the relay energized and the compressor operating.

11. A control system for a refrigerating apparatus having an evaporator for controlling the condition of a medium and a compressor, the combination of, a relay for causing operation of the compressor when energized and including a maintaining switch which is closed when the relay is energized, first switch means, means responsive to the condition of the medium controlled by the evaporator for closing the first switch means when the condition rises to a predetermined high value and for opening the switch means when the condition decreases to a predetermined low value, second and third switch means, means responsive to a condition which is a measure of evaporator temperature for closing the second switch means when the evaporator temperature increases to a predetermined high value and for opening the third switch means when the evaporator temperature decreases to a predetermined low value, means for completing a circuit through the relay and the first and second switch means to energize the relay and start the compressor, and means for completing a circuit through the relay, the first and third switch means and the maintaining switch to maintain the relay energized and the compressor in operation.

12. A control system for a refrigerating apparatus having an evaporator for controlling the condition of a medium and a compressor, the combination of, a relay for causing operation of the compressor when energized and including a maintaining switch which is closed when the relay is energized, first switch means, means responsive to the condition of the medium controlled by the evaporator for closing the first switch means when the condition rises to a predetermined high value and for opening the switch means when the condition decreases to a predetermined low value, second and third switch means, means responsive to a condition which is a measure of pressure on the high pressure side of the refrigerating apparatus for closing the second switch means when the pressure decreases to a predetermined low value and for opening the third switch means when the pressure increases to a predetermined high value, means for completing a circuit through the relay and the first and second switch means to energize the relay and start the compressor, and means for completing a circuit through the relay, the first and third switch means and the maintaining switch to maintain the relay energized and the compressor in operation.

13. A control system for a refrigerating apparatus having an evaporator for controlling the condition of a medium and a compressor, the combination of, a relay for causing operation of the compressor when energized and including a maintaining switch which is closed when the relay is energized, first switch means, means responsive to the condition of the medium controlled by the evaporator for closing the first switch means when the condition rises to a predetermined high value and for opening the switch means when the condition decreases to a predetermined low value, second and third switch means, means responsive to a condition which is a measure of evaporator temperature for closing the second switch means when the evaporator temperature increases to a predetermined high value and for opening the third switch means when the evaporator temperature decreases to a predetermined low value, fourth and fifth switch means, means responsive to a condition which is a measure of pressure on the high pressure side of the refrigerating apparatus for closing the fourth switch means when the pressure decreases to a predetermined low value and for opening the fifth switch means when the pressure increases to a predetermined high value, means for completing a circuit through the relay and the first, second and fourth switch means to energize the relay and start the compressor, and means for completing a circuit through the relay, the first, third and fifth switch means and the maintaining switch to maintain the relay energized and the compressor in operation.

14. A control system for a refrigerating apparatus having an evaporator for controlling the condition of a medium and a compressor, the combination of, a relay for causing operation of the compressor when energized and including a maintaining switch which is closed when the relay is energized, first switch means, means responsive to the condition of the medium controlled by the evaporator for closing the first switch means when the condition rises to a predetermined high value and for opening the switch means when the condition decreases to a predetermined low value, second switch means, means responsive to a condition which is a measure of evaporator temperature for closing the second switch means when the evaporator temperature rises to a predetermined high value, third switch means, means responsive to a condition which is a measure of pressure on the high pressure side of the refrigerating apparatus for closing the third switch means when the pressure decreases to a predetermined value, means for completing a circuit through the relay, and the first, second and third switch means to energize the relay and start the compressor, means for completing a circuit through the relay, the first switch means and the maintaining switch to maintain the relay energized and the compressor operating, fourth switch means, means for closing the fourth switch means when the condition of the medium controlled by the evaporator rises above the predetermined high value, and means for connecting the fourth switch means in parallel with the second switch means.

15. A control system for a refrigerating apparatus having an evaporator for controlling the condition of a medium and a compressor, the combination of, a relay for causing operation of the compressor when energized and including a maintaining switch which is closed when the relay is energized, first switch means, means responsive to the condition of the medium controlled by the evaporator for closing the first switch means when the condition rises to a predetermined high value and for opening the switch means when the condition decreases to a predetermined low value, second and third switch means, means responsive to a condition which is a measure of evaporator temperature for closing the second switch means when the evaporator temperature increases to a predetermined high value and for opening the third switch means when the evaporator temperature decreases to a predetermined low value, means for completing a circuit through the relay and the first and second switch means to energize the relay and start the compressor, and means for completing a circuit through the relay, the first and third switch means and the maintaining switch to maintain the relay energized and the compressor in operation, fourth switch means, means for closing the fourth switch means, and means for connecting the fourth switch means in parallel with the second switch means.

16. A control system for a refrigerating apparatus having an evaporator for controlling the condition of a medium and a compressor, the combination of, a relay for causing operation of the compressor when energized and including a maintaining switch which is closed when the relay is energized, first switch means, means responsive to the condition of the medium controlled by the evaporator for closing the first switch means when the condition rises to a predetermined high value and for opening the switch means when the condition decreases to a predetermined low value, second and third switch means, means responsive to a condition which is a measure of evaporator temperature for closing the second switch means when the evaporator temperature increases to a predetermined high value and for opening the third switch means when the evaporator temperature decreases to a predetermined low value, means for completing a circuit through the relay and the first and second switch means to energize the relay and start the compressor, and means for completing a circuit through the relay, the first and third switch means and the maintaining switch to maintain the relay energized and the compressor in operation, fourth switch means, means for closing the fourth switch means when the condition of the medium controlled by the evaporator rises above the predetermined high value, and means for connecting the fourth switch means in parallel with the second switch means.

17. A control system for a refrigerating apparatus having an evaporator for controlling the condition of a medium and a compressor, the combination of, a relay for causing operation of the compressor when energized and including a maintaining switch which is closed when the relay is energized, first switch means, means responsive to the condition of the medium controlled by the evaporator for closing the first switch means when the condition rises to a predetermined high value and for opening the switch means when the condition decreases to a predetermined low value, second and third switch means, means responsive to a condition which is a measure of evaporator temperature for closing the second switch means when the evaporator temperature increases to a predetermined high value and for opening the third switch means when the evaporator temperature decreases to a predetermined low value, fourth and fifth switch means, means responsive to a condition which is a measure of pressure on the high pressure side of the refrigerating apparatus for closing the fourth switch means when the pressure decreases to a predetermined low value and for opening the fifth switch means when the pressure increases to a predetermined high value, means for completing a circuit through the relay and the first, second and fourth switch means to energize the relay and start the compressor, means for completing a circuit through the relay, the first, third and fifth switch means and the maintaining switch to maintain the relay energized and the compressor in operation, sixth switch means, means for closing the sixth switch means, and means for connecting the sixth switch means in parallel with the second switch means.

18. A control system for a refrigerating apparatus having an evaporator for controlling the condition of a medium and a mechanism for controlling the circulation of refrigerant through the evaporator, the combination of, control means responsive to the condition of the medium controlled by the evaporator, control means responsive to a condition which is a measure of evaporator temperature, control means responsive to a condition which is a measure of pressure on the high pressure side of the refrigerating apparatus, means controlled by all of the control means to operate the mechanism to start circulation of refrigerant through the evaporator only when the condition of the medium rises to a predetermined value, the evaporator temperature rises to a predetermined value, and the pressure on the high pressure side decreases to a predetermined value, and means for rendering ineffective the control means responsive to the condition which is a measure of evaporator temperature to cause refrigerant to be circulated through the evaporator in accordance with the condition of the medium regardless of the temperature of the evaporator.

19. A control system for a refrigerating apparatus having an evaporator for controlling the condition of a medium and an electrically controlled mechanism for controlling the circulation of refrigerant through the evaporator, the combination of, first switch means, means responsive to the condition of the medium controlled by the evaporator for closing the first switch means when the condition rises to a predetermined high value and for opening the switch means when the condition decreases to a predetermined low value, second switch means, means responsive to a condition which is a measure of evaporator temperature for closing the second switch means when the evaporator temperature rises to a predetermined high value, means for completing a starting circuit through the first and second switch means to operate the electrically controlled mechanism to circulate refrigerant through the evaporator, a maintaining switch, means for closing the maintaining switch as an incident to completion of the starting circuit, means for completing a maintaining circuit through the first switch means and the maintaining switch to maintain the electrically controlled mechanism in operation and circulation of refrigerant through the evaporator, said maintaining switch remaining closed as long as the maintaining circuit is completed.

20. A control system for a refrigerating apparatus having an evaporator for controlling the condition of a medium and an electrically controlled mechanism for controlling the circulation of refrigerant through the evaporator, the combination of, first switch means, means responsive to the condition of the medium controlled by the evaporator for closing the first switch means when the condition rises to a predetermined high value and for opening the switch means when the condition decreases to a predetermined low value, second switch means, means responsive to a condition which is a measure of evaporator temperature for closing the second switch means when the evaporator temperature rises to a predetermined high value, third switch means, means responsive to a condition which is a measure of pressure on the high pressure side of the refrigerating apparatus for closing the third switch means when the pressure decreases to a predetermined value, means for completing a starting circuit through the first, second and third switch means to operate the electrically controlled mechanism to circulate refrigerant through the evaporator, a maintaining switch, means for closing the maintaining switch as an incident to completion of the starting circuit, means for completing a maintaining circuit through the first switch means and the maintaining switch to maintain the electrically controlled mechanism in operation and circulation of refrigerant through the evaporator, said maintaining switch remaining closed as long as the maintaining circuit is completed.

21. A control system for a refrigerating apparatus having an evaporator for controlling the condition of a medium and an electrically controlled mechanism for controlling the circulation of refrigerant through the evaporator, the combination of, first switch means, means responsive to the condition of the medium controlled by the evaporator for closing the first switch means when the condition rises to a predetermined high value and for opening the switch means when the condition decreases to a predetermined low value, second and third switch means, means responsive to a condition which is a measure of evaporator temperature for closing the second switch means when the evaporator temperature increases to a predetermined high value and for opening the third switch means when the evaporator temperature decreases to a predetermined low value, means for completing a starting circuit through the first and second switch means to operate the electrically controlled mechanism to circulate refrigerant through the evaporator, a maintaining switch, means for closing the maintaining switch as an incident to completion of the starting circuit, means for completing a maintaining circuit through the first and third switch means and the maintaining switch to maintain the electrically controlled mechanism in operation and circulation of refrigerant through the evaporator, said maintaining switch remaining closed as long as the maintaining circuit is completed.

22. A control system for a refrigerating apparatus having an evaporator for controlling the condition of a medium and an electrically controlled mechanism for controlling the circulation of refrigerant through the evaporator, the combination of, first switch means, means responsive to the condition of the medium controlled by the evaporator for closing the first switch means when the condition rises to a predetermined high value and for opening the switch means when the condition decreases to a predetermined low value, second and third switch means, means responsive to a condition which is a measure of pressure on the high pressure side of the refrigerating apparatus for closing the second switch means when the pressure decreases to a predetermined low value and for opening the third switch means when the pressure increases to a predetermined high value, means for completing a starting circuit through the first and second switch means to operate the electrically controlled mechanism to circulate refrigerant through the evaporator, a maintaining switch, means for closing the maintaining switch as an incident to completion of the starting circuit, means for completing a maintaining circuit through the first and third switch means and the maintaining switch to maintain the electrically controlled mechanism in operation and circulation of refrigerant through the evaporator, said maintaining switch remaining closed as long as the maintaining circuit is completed.

23. A control system for a refrigerating apparatus having an evaporator for controlling the condition of a medium and an electrically controlled mechanism for controlling the circulation of refrigerant through the evaporator, the combination of, first switch means, means responsive to the condition of the medium controlled by the evaporator for closing the first switch means when the condition rises to a predetermined high value and for opening the switch means when the condition decreases to a predetermined low value, second and third switch means, means responsive to a condition which is a measure of evaporator temperature for closing the second switch means when the evaporator temperature increases to a predetermined high value and for opening the third switch means when the evaporator temperature decreases to a predetermined low value, fourth and fifth switch means, means responsive to a condition which is a measure of pressure on the high pressure side of the refrigerating apparatus for closing the fourth switch means when the pressure decreases to a predetermined low value and for opening the fifth switch means when the pressure increases to a predetermined high value, means for completing a starting circuit through the first, second and fourth switch means to operate the electrically controlled mechanism to circulate refrigerant through the evaporator, a maintaining switch, means for closing the maintaining switch as an incident to completion of the starting circuit, means for completing a maintaining circuit through the first, third and fifth switch means and the maintaining switch to maintain the electrically controlled mechanism in operation and circulation of refrigerant through the evaporator, said maintaining switch remaining closed as long as the maintaining circuit is completed.

24. A control system for a refrigerating apparatus having an evaporator for controlling the condition of a medium and an electrically controlled mechanism for controlling the circulation of refrigerant through the evaporator, the combination of, first switch means, means responsive to the condition of the medium controlled by the evaporator for closing the first switch means when the condition rises to a predetermined high value and for opening the switch means when the condition decreases to a predetermined low value, second switch means, means responsive to a condition which is a measure of evaporator temperature for closing the second switch means when the evaporator temperature rises to a predetermined high value, means for completing a starting circuit through the first and second switch means to operate the electrically controlled mechanism to circulate refrigerant through the evaporator, a maintaining switch, means for closing the maintaining switch as an incident to completion of the starting circuit, means for completing a maintaining circuit through the first switch means and the maintaining switch to maintain the electrically controlled mechanism in operation and circulation of refrigerant through the evaporator, said maintaining switch remaining closed as long as the maintaining circuit is completed, third switch means, means for closing the third switch means, and means for connecting the third switch means in parallel with the second switch means.

25. A control system for a refrigerating apparatus having an evaporator for controlling the condition of a medium and an electrically controlled mechanism for controlling the circulation of refrigerant through the evaporator, the combination of, first switch means, means responsive to the condition of the medium controlled by the evaporator for closing the first switch means when the condition rises to a predetermined high value and for opening the switch means when the condition decreases to a predetermined low value, second switch means, means responsive to a condition which is a measure of evaporative temperature for closing the second switch means when the evaporator temperature rises to a predetermined high value, third switch means, means responsive to a condition which is a measure of pressure on the high pressure side of the refrigerating apparatus for closing the third switch means when the pressure decreases to a predetermined value, means for completing a starting circuit through the first, second and third switch means to operate the electrically controlled mechanism to circulate refrigerant through the evaporator, a maintaining switch, means for closing the maintaining switch as an incident to completion of the starting circuit, means for completing a maintaining circuit through the first switch means and the maintaining switch to maintain the electrically controlled mechanism in operation and circulation of refrigerant through the evaporator, said maintaining switch remaining closed as long as the maintaining circuit is completed, fourth switch means, means for closing the fourth switch means, and means for connecting the fourth switch means in parallel with the second switch means.

26. A control system for a refrigerating apparatus having an evaporator for controlling the condition of a medium and an electrically controlled mechanism for controlling the circulation of refrigerant through the evaporator, the combination of, first switch means, means responsive to the condition of the medium controlled by the evaporator for closing the first switch means when the condition rises to a predetermined high value and for opening the switch means when the condition decreases to a predetermined low value, second and third switch means, means responsive to a condition which is a measure of evaporator temperature for closing the second switch means when the evaporator temperature increases to a predetermined high value and for opening the third switch means when the evaporator temperature decreases to a predetermined low value, means for completing a starting circuit through the first and second switch means to operate the electrically controlled mechanism to circulate refrigerant through the evaporator, a maintaining switch, means for closing the maintaining switch as an incident to completion of the starting circuit, means for completing a maintaining circuit through the first and third switch means and the maintaining switch to maintain the electrically controlled mechanism in operation and circulation of refrigerant through the evaporator, said maintaining switch remaining closed as long as the maintaining circuit is completed, third switch means, means for closing the third switch means, and means for connecting the third switch means in parallel with the second switch means.

27. A control system for a refrigerating apparatus having an evaporator for cooling a medium and a mechanism for controlling the circulation of refrigerant through the evaporator, the combination of, control means responsive to the temperature of the medium for operating the mechanism to cause circulation of refrigerant through the evaporator when the temperature of the medium rises to a predetermined value, control means for also controlling the mechanism to prevent at intervals the circulation of refrigerant through the evaporator for the purpose of defrosting the evaporator, and control means responsive to the temperature of the medium for rendering said last mentioned control means ineffective when the temperature of the medium rises above the predetermined value.

28. In a control system for a refrigerating apparatus having an evaporator for controlling the condition of a medium and an electrically controlled mechanism for controlling the circulation of refrigerant through the evaporator, the combination of, first switch means, means responsive to the condition of the medium controlled by the evaporator for closing the first switch means when the condition rises to a predetermined value, second switch means, means responsive to a condition which is a measure of evaporator temperature for closing the second switch means when the evaporator temperature rises to a predetermined value, means for completing a starting circuit through the second switch means to operate the electrically controlled mechanism to circulate refrigerant through the evaporator, a maintaining switch, means for closing the maintaining switch as an incident to completion of the starting circuit, means for completing a maintaining circuit through the first switch means and the maintaining switch independently of the second switch means to maintain the electrically controlled mechanism in operation and circulation of refrigerant through the evaporator, said maintaining switch remaining closed as long as the maintaining circuit is completed.

29. In a control system for a refrigerating apparatus having an evaporator for controlling the condition of a medium and an electrically controlled mechanism for controlling the circulation of refrigerant through the evaporator, the combination of, first switch means, means responsive to the condition of the medium controlled by the evaporator for closing the first switch means when the condition rises to a predetermined value, second switch means, means responsive to a condition which is a measure of evaporator temperature for closing the second switch means when the evaporator temperature rises to a predetermined value, third switch means, means responsive to a condition which is a measure of the pressure on the high pressure side of the refrigerating apparatus for opening the third switch means when the pressure rises to a predetermined value, means for completing a starting circuit through the second switch means to operate the electrically controlled mechanism to circulate refrigerant through the evaporator, a maintaining switch, means for closing the maintaining switch as an incident to completion of the starting circuit, means for completing a maintaining circuit through the first and third switch means and the maintaining switch independently of the second switch means to maintain the electrically controlled mechanism in operation and circulation of refrigerant through the evaporator, said maintaining switch remaining closed as long as the maintaining circuit is completed.

WAYLAND R. MILLER.